United States Patent
Blair et al.

(10) Patent No.: US 6,813,117 B2
(45) Date of Patent: Nov. 2, 2004

(54) SHUTTER MECHANISM FOR A PORTABLE DATA STORAGE CARTRIDGE

(75) Inventors: John Ray Blair, Tucson, AZ (US); Allen Ronald Cox, Eastleigh (GB); David Michael Davis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 10/035,185

(22) Filed: Jan. 4, 2002

(65) Prior Publication Data

US 2003/0128466 A1 Jul. 10, 2003

(51) Int. Cl.$^7$ .................... G11B 23/03; G11B 23/087
(52) U.S. Cl. .................. 360/132; 360/133; 720/738; 242/347.1
(58) Field of Search ................ 360/132, 133; 369/291; 242/347.1, 347.2, 338; 720/738

(56) References Cited

U.S. PATENT DOCUMENTS

| | | | | |
|---|---|---|---|---|
| 4,093,149 A | | 6/1978 | Shroff et al. ............ 242/338.3 |
| 4,817,079 A | * | 3/1989 | Covington ............... 369/291 |
| 4,897,751 A | | 1/1990 | Goto ...................... 360/132 |
| 5,422,775 A | * | 6/1995 | Martin .................... 360/133 |
| 5,646,807 A | * | 7/1997 | Ohnuki et al. ............ 360/133 |
| 5,701,216 A | * | 12/1997 | Yamamoto et al. ....... 360/99.02 |
| 6,111,725 A | | 8/2000 | Christie .................. 360/132 |
| 6,377,451 B1 | * | 4/2002 | Furuya ................... 361/686 |
| 6,411,583 B1 | * | 6/2002 | Yamamoto et al. ....... 369/77.2 |

* cited by examiner

*Primary Examiner*—David Ometz
(74) *Attorney, Agent, or Firm*—John H. Holcombe (57) ABSTRACT

A shutter mechanism is provided at an access opening in a portable data storage cartridge. Clamshell shutters meet at a common junction in the access opening. Actuation paddles positioned at the clamshell shutters are arranged to, when engaged by actuation pins, pivot the respective clamshell shutters in opposite directions away from the common junction, to expose the access opening. The clamshell shutters are mounted such that, when pivoted away from the common junction, each clamshell shutter remains within the cartridge housing.

38 Claims, 4 Drawing Sheets

SHUTTER MECHANISM FOR A PORTABLE DATA STORAGE CARTRIDGE

Commonly assigned U.S. patent application Ser. No. 09/842,030, filed Apr. 26, 2001, is incorporated for its showing of portable data storage cartridges and a transfer station for providing data transfer with respect to such portable data storage cartridges.

FIELD OF THE INVENTION

This invention relates to portable data storage cartridges, and, more particularly, to openable and closable covers for access openings in such portable data storage cartridges.

BACKGROUND OF THE INVENTION

Portable data storage cartridges provide convenient means for storing data which may be transported between uses. One example comprises automated data storage libraries which can contain large quantities of portable data storage cartridges on storage shelves and employ robot accessors to access a cartridge when needed and deliver the cartridge to a data storage drive or transfer station.

An opening is provided in an exterior housing for such cartridges to allow access to the data. In the example of a data storage device housed in a portable data storage cartridge, such as discussed in the incorporated U.S. patent application Ser. No. 09/842,030, an opening is provided such that electrical contacts of an external interface within the cartridge may be engaged by a matching connector of a transfer station. In the example of a magnetic tape, an access opening is provided either for withdrawal of a portion of the magnetic tape, or for insertion of a read/write mechanism of a data storage drive into the cartridge.

When not in use, the cartridges are typically transported for storage away from the transfer station or data storage drive, for example, in storage shelves, and are exposed to potential contamination. Hence, a door is typically provided to cover the access opening when the cartridge is not in use. One example of a covering door and dust cover is illustrated in U.S. Pat. No. 4,897,751, which is pivoted from an access opening on one edge of a cartridge to a position exterior to the cartridge on an adjacent top side of the cartridge. Such a pivoting door arrangement requires excessive space exterior to the cartridge to accommodate the door and dust cover. A similar example is illustrated in U.S. Pat. No. 4,093,149, in which two adjacent doors are pivoted from one edge of a cartridge in opposite directions outwardly to extend both in front of the edge of the cartridge and to the adjacent edges of the cartridge, requiring a great amount of space exterior to the cartridge to accommodate the doors.

The need to reduce the external space requirement was recognized in U.S. Pat. No. 6,111,725, which employs a multiple panel hinged door. One panel is located on the top of the cartridge and is arranged to slide along the top. The other panel is at the front of the cartridge, which has a track at each side of the door opening and in which spindles of the front panel ride. The tracks are curved up and toward the rear of the cartridge, such that, when the top panel is pushed toward the rear of the cartridge, the front panel is tilted to the rear of the cartridge, and the bottom of the front panel rides up the tracks toward the top and rear of the cartridge. A linear spring attached to the top of the top panel pulls the top panel toward the front so that the top panel pushes the front panel along the track into the closed position. Although saving space outside of the cartridge, substantial space is required within the cartridge so that the front panel can tilt inwardly and follow the track. Further, the friction of the tracks may interfere with smooth operation of the mechanism. Still further, a high degree of precision is required to insure that tolerances between the pieces do not allow the front panel to become skewed and jammed, especially when being pushed by the top panel.

In addition to the desire to avoid excessive use of space exterior to the cartridge as discussed above, it may be advantageous to avoid excessive use of space within the cartridge, since the number of cartridges vastly exceeds the number of drives and transfer stations.

SUMMARY OF THE INVENTION

Hence, it is an object of the present invention to provide a means for opening and closing an access opening of a portable data storage cartridge which, in operation, has a space requirement which is small as compared to the total volume of the cartridge.

Another object of the present invention is to provide a means for opening and closing an access opening of a portable data storage cartridge which has low friction and has a reduced requirement for precision.

A shutter mechanism of a portable data storage cartridge is provided at an access opening in an exterior housing of a portable data storage cartridge.

First and second clamshell shutters are arranged to meet and form a common junction; each clamshell shutter having a pivot axis substantially parallel to the common junction. First and second sets of actuation paddles are positioned respectively at the first and second clamshell shutters, and, in one embodiment, are formed in common with the respective first and second clamshell shutters. The actuation paddles are arranged to, when engaged by actuation pins, pivot the respective clamshell shutters in opposite directions away from the common junction.

First and second sets of pivot supports are mounted within the portable data storage cartridge. Each set of pivot supports mounts the pivot axis of one of the clamshell shutters such that the pivot axes are parallel to one another, such that the common junction is positioned at the access opening of the exterior housing, such that, when pivoted away from the common junction by the engaged actuation paddles to expose the access opening, each clamshell shutter remains within the exterior housing. In one embodiment, the pivot supports comprise trunion bearings which are positioned such that pivots forming the pivot axes of the first and second clamshell shutters are closely adjacent and separated.

Springs are arranged to urge the first and second clamshell shutters about the respective pivot axis toward the common junction to close the access opening.

In one embodiment, the clamshell shutters each comprises a flat surface at the common junction, which extends longitudinally along the common junction, and the flat surface faces outwardly at the access opening, such that an opposed edge of each of the flat surfaces forms the common junction.

In one embodiment, the clamshell shutters each comprises a section of a peripheral surface of a right cylinder extending from the flat surface away from the common junction, and has end caps mounting the actuation paddles, thereby minimizing the use of space internal to the cartridge.

In one embodiment, the actuation paddles each comprises a camming surface for engagement by an actuation pin. The camming surfaces are of a length such that the ends thereof opposite a respective pivot axis, when engaged by the actuation pins such that the respective clamshell shutters are pivoted to a fully open position, the actuation pins move across the end thereof, thereby limiting the pivoting action.

In one embodiment, the actuation paddles each comprises a Teflon filled plastic at a camming surface thereof for engagement by one of the actuation pins. Additionally, commonly formed actuation paddles and clamshell shutters may be formed of a Teflon filled plastic.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
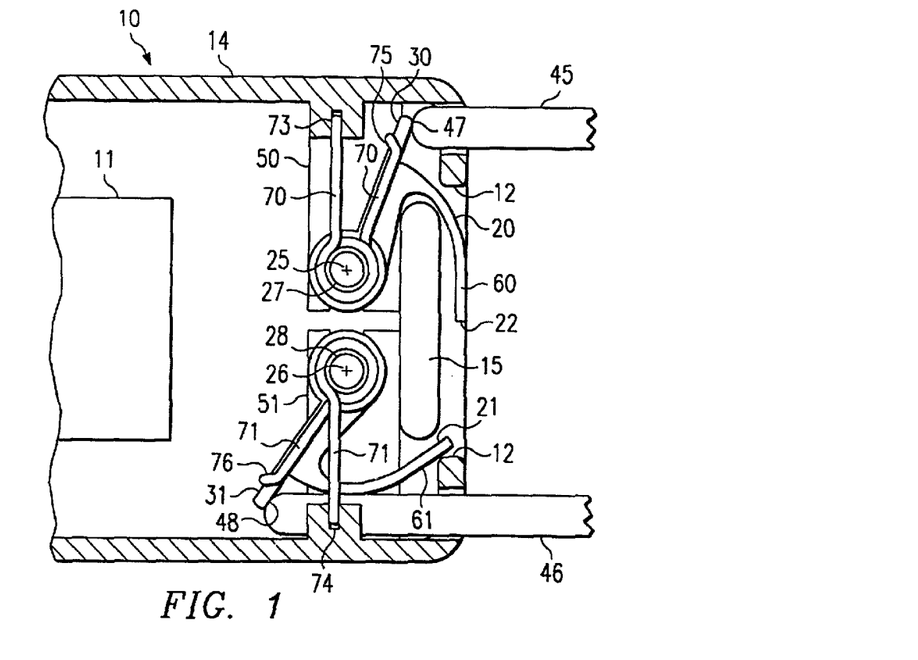
FIG. 1 is a cut away side view of a portable data storage cartridge illustrating an embodiment of a shutter mechanism in accordance with the present invention.

Referring to FIG. 1, a portable data storage cartridge 10 is illustrated, which for example, houses a data storage device 11, such as discussed in the incorporated U.S. patent application Ser. No. 09/842,030. An opening 12 is provided in an exterior housing 14 of the cartridge 10 to allow access to the data. In the above example, the opening 12 allows access by a data transfer station to electrical contacts of an external interface 15 within the cartridge. In the example of a magnetic tape, an access opening is provided in the exterior housing of a portable data storage cartridge either for withdrawal of a portion of the magnetic tape, or for insertion of a read/write mechanism of a data storage drive into the cartridge.

When not in use, the cartridges are typically stored away from the transfer station or data storage drive, for example, in storage shelves, and are exposed to potential contamination.

First and second clamshell shutters 20 and 21 are arranged to meet and form a common junction 22, closing the opening 12. The first clamshell shutter 20 is shown in the closed position to form the common junction, and the second clamshell shutter 21 is shown in the open position. Each clamshell shutter has a pivot axis, respectively, pivot axis 25 for clamshell shutter 20, and pivot axis 26 for clamshell shutter 21, substantially parallel to the common junction 22. In the embodiment of FIG. 1, the pivot axes 25 and 26 are formed by sets of pivot pins 27 and 28, respectively, extending from the respective clamshell shutter on either side of the clamshell shutter.

First and second sets of actuation paddles 30 and 31 are positioned respectively at the first and second clamshell shutters, and, in one embodiment, are formed in common with the respective first and second clamshell shutters 20 and 21. Alternatively, the actuation paddles may be formed separately from the clamshell shutters and then attached, for example, by cementing. In one embodiment, the set of actuation paddles comprises an actuation paddle at either side of the clamshell shutter.

Figure 2:
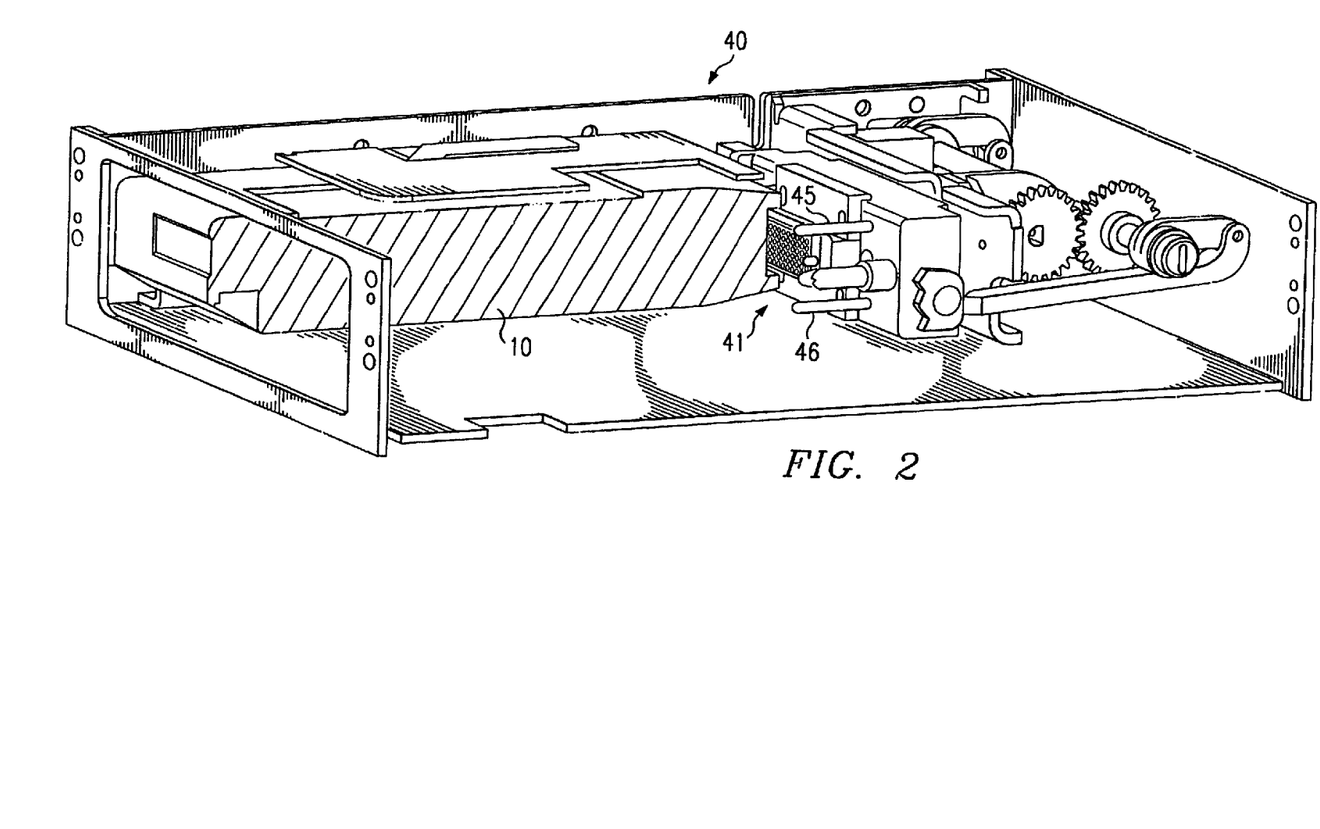
FIG. 2 is an isometric view of a cartridge loading mechanism for opening the shutter mechanism of FIG. 1 for access to a portable data storage cartridge, which is illustrated in cross section.

Referring to FIG. 2, a transfer station or data storage drive 40 is illustrated which accesses the portable data storage cartridge 10 of FIG. 1. The example of FIG. 2 comprises a transfer station such as discussed in the incorporated U.S. patent application Ser. No. 09/842,030, in which electrical contacts of the external interface 15 within the cartridge 10 of FIG. 1 may be engaged by a matching connector 41 of the transfer station 40. The transfer station 40 comprises actuation pins 45, 46 to open the shutters 20 and 21 of the cartridge. Specifically, the actuation pins 45, 46 of the transfer station or data storage drive accesses the actuation paddles 30 and 31, and the actuation paddles, when engaged by the actuation pins, pivot the respective clamshell shutter 20, 21 in opposite directions away from the common junction 22. In FIG. 2, a second set of actuation pins are provided on the opposite side of connector 41 to engage the other of the set of actuation paddles on the opposite side of the cartridge 10.

In FIG. 1, for the purpose of illustrating the operation of the present invention, actuation pin 45 is illustrated as just engaging a camming surface 47 of the actuation paddle 30, so that shutter 20 is in the closed position at the common junction 22, and actuation pin 46 is in the fully inserted position at a camming surface 48 of the actuation paddle 31 to fully operate the actuation paddle, so that shutter 21 is in the open position, pivoted around pivot axis 26 away from the common junction 22. In the embodiment of FIG. 1, the camming surfaces 47, 48 of the actuation paddles each comprises a straight camming surface for engagement by the actuation pin.

First and second sets of pivot supports 50 and 51 are mounted within the portable data storage cartridge. Each set of pivot supports mounts the pivot axis 25 or 26 of one of the clamshell shutters such that the pivot axes 25, 26 are parallel to one another, such that the common junction 22 is positioned at the access opening of the exterior housing, such that, when pivoted away from the common junction by the engaged actuation paddles 30, 31 to expose the access opening, each clamshell shutter 20, 21 remains within the exterior housing 14 of the cartridge 10.

In one embodiment, the pivot supports 50, 51 comprise trunion bearings which are positioned such that the pivot pins 27, 28 forming the pivot axes 25, 26 of the first and second clamshell shutters 20, 21 are closely adjacent and separated. By having the pivot axes 25, 26 closely adjacent, and the clamshell shutters 20, 21 each comprising, in part, a section of a peripheral surface of a right circular cylinder, the use of space internal to the cartridge 10 is minimized.

In accordance with another aspect of the present invention, in one embodiment, the clamshell shutters 20, 21 each comprises a flat surface 60, 61 at the common junction, which extends longitudinally along the common junction, and the flat surface facing outwardly at the access opening 12, whereby an opposed edge of each of the flat surfaces forms the common junction 22. The flat surfaces 60, 61 compensate for the distance between the pivot axes 25, 26, again, such that the use of space internal to the cartridge 10 is minimized.

Springs 70, 71 are arranged to urge the first and second clamshell shutters 20, 21 about the respective pivot axis toward the common junction 22 to close the access opening 12. In the embodiment of FIG. 1, the springs 70, 71 comprise torsion springs wound around the pivot pins 27, 28, one end of which is positioned within a well 73, 74 of the cartridge housing 14, and the other end of which 75, 76 is positioned at an actuation paddle 30, 31. Similar springs may be positioned at the opposite side of the clamshell shutters.

As the result, the actuation paddles 30, 31, when engaged by the actuation pins 45, 46, pivot the respective clamshell shutter 20, 21 about the respective pivot axis 25, 26 against the urging of springs 70, 71 in opposite directions away from the common junction 22, opening the shutters and exposing the interior of the cartridge.

Figure 3:
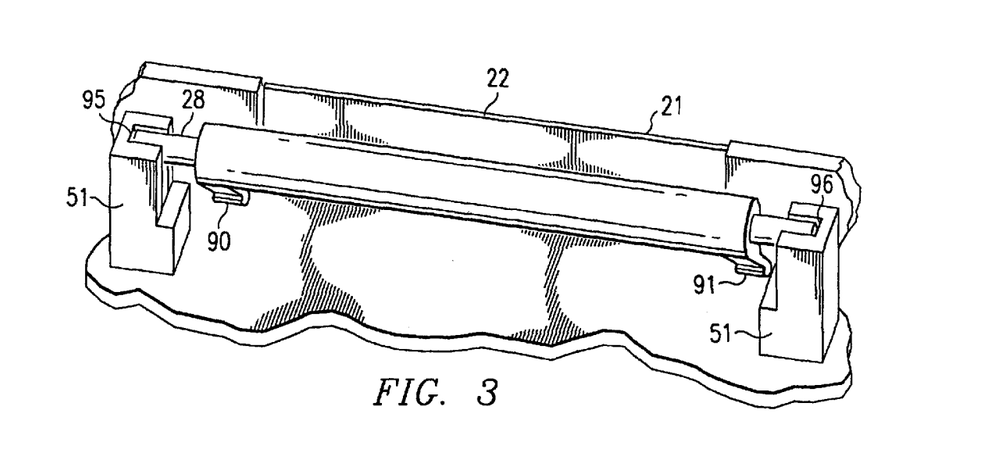
FIG. 3 is an isometric view of a portion of a portable data storage cartridge illustrating an alternative embodiment of a shutter in accordance with the present invention.
Figure 4:
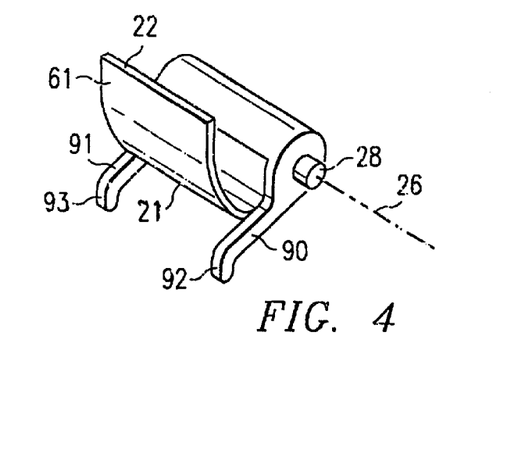
FIG. 4 is an isometric view of the shutter of FIG. 3.

FIGS. 3 and 4 illustrate an embodiment of the present invention with the same clamshell shutters of FIG. 1, e.g., clamshell shutter 21, comprising a section of a peripheral surface of a right cylinder extending from the flat surface away from the common junction 22, and having the same pivot pins 28, but with an alternative embodiment of the actuation paddles 90, 91 having a convex camming surface 92, 93 for engagement by an actuation pin.

In one embodiment, the actuation paddles 90, 91 each comprises a Polytetrafluoroethylene (PTFE or Teflon) filled plastic at the camming surface 92, 93 thereof for engagement by one of the actuation pins. Additionally or alternatively, the commonly formed actuation paddles 90, 91 and clamshell shutter 21 may be formed of a Teflon filled plastic. Examples of Teflon filled plastic comprise DL 4040 or DFL 4030 manufactured by General Electric. The Teflon filled plastic reduces potential wear on the actuation pins 45, 46 of FIG. 2, in that a single transfer station or data storage drive 40 may mount and load many thousands of cartridges.

Referring to FIG. 3, in one embodiment, the pivot supports 51 comprise trunion bearings 95, 96 which are positioned such that the pivot pins 28 forming the pivot axis 26 of the clamshell shutter 21. The trunion bearings 95, 96 may comprise substantially a few degrees over 180 degrees such that the pivot pins may be snapped into position such that the bearings hold the pivot pins in position so that they do not fall out of the bearings. The bearings allow freedom of pivoting movement of the pivot pins about the pivot axis, such that the shutter mechanism provides a low friction pivoting movement.

Figure 5:
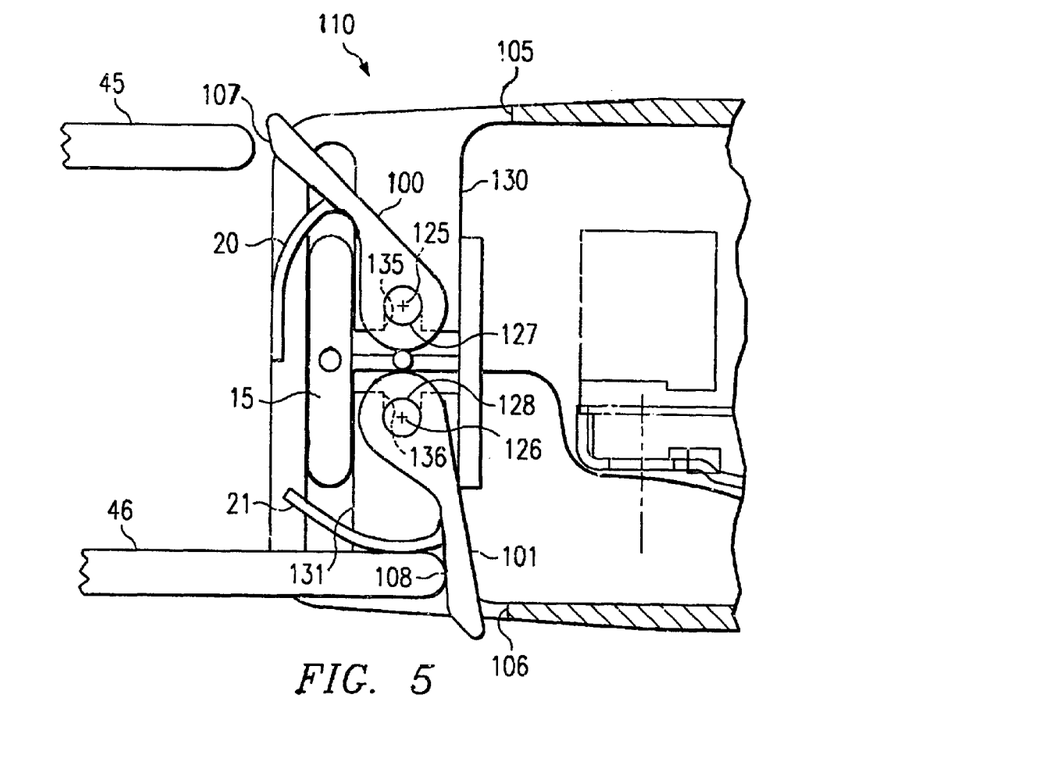
FIG. 5 is a cut away side view of a portable data storage cartridge illustrating an further alternative embodiment of a shutter in accordance with the present invention.

FIG. 5 illustrates an alternative embodiment of the present invention, employing the same clamshell shutters 20, 21 of FIG. 1, with actuation paddles 100, 101 of a length such that the ends thereof protrude through openings 105, 106 of the cartridge 110 to allow manual opening of the clamshell shutters. The camming surfaces 107, 108 are also of a convex shape for engagement by an actuation pin 45, 46.

Additionally, in one embodiment of the present invention, the pivot axes 125, 126 are formed by pivot pins 127, 128 mounted on pivot supports 130, 131 of the cartridge 110. In this embodiment, slots 135, 136 of the clamshell shutters pivot on the pivot pins 127, 128. Hence, the terms "pivot axis" and "pivot supports" are defined as either formed by pivot pins 27, 28 of the clamshell shutters mounted in bearings 95, 96 of pivot supports 50, 51 as shown in FIGS. 1 and 3, or formed by slots 135, 136 of the clamshell shutters which pivot on the pivot pins 127, 128 mounted on pivot supports 130, 131 of the cartridge 110 as shown in FIG. 5, and equivalents thereof. The pivoting movement both provides low friction action and allows a reduced requirement for precision.

Figure 6:
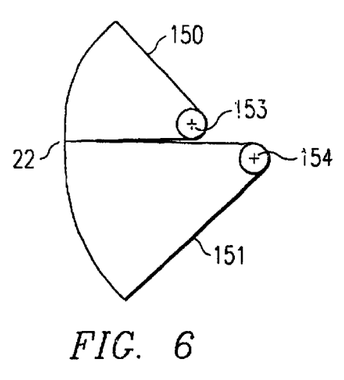
FIGS. 6, 7 and 8 are diagrammatic illustrations of alternative embodiments of shutters in accordance with the present invention.
Figure 7:
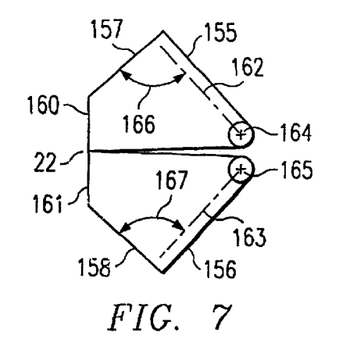
Figure 8:
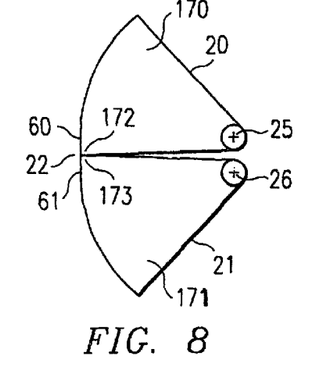

FIGS. 6, 7 and 8 illustrate alternative embodiments of clamshell shutters in accordance with the present invention, each comprising a section of a peripheral surface of a right cylinder extending from the flat surface away from the common junction.

FIG. 6 illustrates an embodiment of first and second clamshell shutters 150, 151 in which each comprises a section of a peripheral surface of a non-round right cylinder extending from the common junction 22. In the specific example, the non-round right cylinders are each a section of an elliptical right cylinder. As such, the cylinders provide a common junction 22 which provides good usage of the interior space of the cartridge, but does not specifically have a flat surface at the common junction. Also, the clamshell shutters 150, 151 are non-symmetrical, having the pivot axes 153, 154 spaced apart in the horizontal direction, but closely spaced in the vertical direction.

FIG. 7 illustrates an embodiment of first and second clamshell shutters 155, 156 in which each comprises an angled flat surface 157, 158 extending from the flat surface 160, 161 away from the common junction 22 and at an angle such that the angled flat surface 157, 158 is, at a line thereof, perpendicular to a plane 162, 163 intercepting the respective pivot axis 164, 165, as shown by perpendicular angles 166, 167. As such, the angled surfaces 157, 158, 160, 161 provide a common junction 22 and provides good usage of the interior space of the cartridge.

FIG. 8 illustrates an embodiment of clamshell shutters 20 and 21 of FIG. 1, which has end caps 170, 171 for mounting the actuation paddles. Additionally, the opposed edges 172, 173 of each of the flat surfaces 60, 61 forming the common junction 22 are straight and parallel to the respective pivot axis 25, 26, such that the common junction 22 comprises a straight line parallel to the pivot axes.

Figure 9:
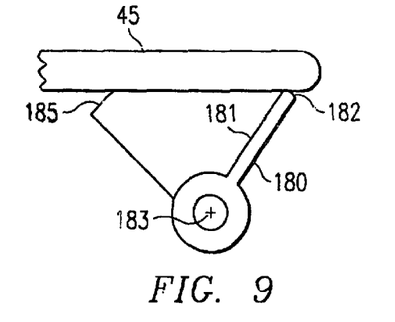
FIGS. 9, 10 and 11 are diagrammatic illustrations of alternative embodiments of actuation paddles in accordance with the present invention.
Figure 10:
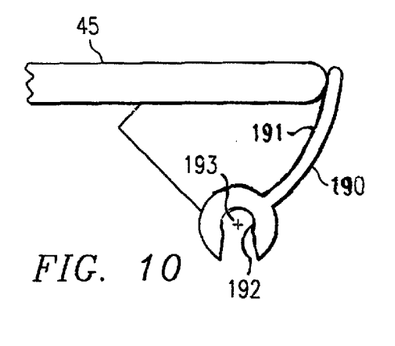
Figure 11:
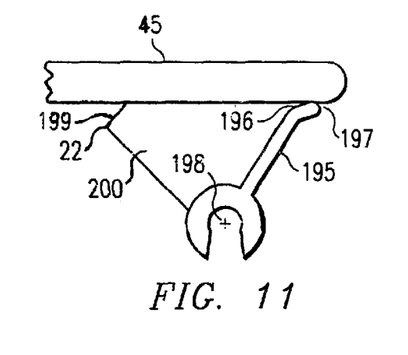

FIGS. 9, 10 and 11 illustrate alternative embodiments of actuation paddles in accordance with the present invention, each comprising a camming surface for engagement by an actuation pin.

FIG. 9 illustrates an embodiment of an actuation paddle 180 wherein the camming surface 181 is of a length such that the end thereof 182 opposite a respective pivot axis 183, when engaged by the actuation pin 45 such that the respective clamshell shutter 185 is pivoted to a fully open position, the actuation pin moves across the end 182, thereby limiting the pivoting action and allowing a reduced requirement for precision.

FIG. 10 illustrates an embodiment of an actuation paddle 190 which comprises a concave camming surface 191 for engagement by the actuation pin 45. FIG. 10 also illustrates a slot 192 forming a pivot axis 193, as discussed above with respect to FIG. 5.

FIG. 11 illustrates an embodiment of an actuation paddle 195 which comprises a convex camming surface 196 for engagement by the actuation pin 45. Additionally, as discussed with respect to FIG. 9, the camming surface 196 is of a length such that the end thereof 197 opposite a respective pivot axis 198, when engaged by the actuation pin 45 such that the respective clamshell shutter 199 is pivoted to a fully open position, the actuation pin moves across the end 197, thereby limiting the pivoting action.

Further, in the embodiment of FIG. 11, the clamshell shutter 199 comprises a section of a peripheral surface of a right cylinder extending from the flat surface away from the common junction 22, and has end caps 200 mounting the actuation paddles 195, thereby minimizing the use of space internal to the cartridge.

In the context of the present invention, the term "right cylinder" is defined as comprising a right cylinder of any peripheral shape, including, but not limited to, a circular shape, an elliptical shape, an ovoid shape, and a shape including straight lines.

While the preferred embodiments of the present invention have been illustrated in detail, it should be apparent that modifications and adaptations to those embodiments may occur to one skilled in the art without departing from the scope of the present invention as set forth in the following claims.

We claim:

1. A shutter mechanism for a portable data storage cartridge, said portable data storage cartridge having an exterior housing and having an access opening in said exterior housing; said shutter mechanism comprising:

first and second clamshell shutters arranged to meet and form a common junction; each said clamshell shutter having a pivot axis substantially parallel to said common junction; said first and second clamshell shutters each comprising a section of a surface that is parallel to and radially spaced from said pivot axis, said section of said surface extending away from said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;

first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and springs arranged to urge said first and second clamshell shutters about said respective pivot axis toward said common junction.

2. The shutter mechanism of claim 1, wherein said first and second clamshell shutters each comprises a flat surface at said common junction extending longitudinally along said common junction, said flat surface facing outwardly at said access opening, whereby an opposed edge of each of said flat surfaces form said common junction.

3. The shutter mechanism of claim 2, wherein said opposed edges of each of said flat surfaces forming said common junction are straight and parallel to said respective pivot axis, such that said common junction comprises a straight line parallel to said pivot axes.

4. A shutter mechanism for a portable data storage cartridge, said portable data storage cartridge having an exterior housing and having an access opening in said exterior housing; said shutter mechanism comprising:

first and second clamshell shutters arranged to meet and form a common junction; each said clamshell shutter having a pivot axis substantially parallel to said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;

first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and springs arranged to urge said first and second clamshell shutters about said respective pivot axis toward said common junction;

wherein said first and second clamshell shutters each comprises a pivot at each of opposite ends thereof to form said pivot axis, and wherein said first and second sets of pivot supports each comprises a set of trunion bearings arranged such that said pivots of said first and second clamshell shutters are closely adjacent and separated.

5. The shutter mechanism of claim 4, wherein said first and second clamshell shutters each comprises a section of a peripheral surface of a non-round right cylinder extending from said common junction, and having end caps mounting said actuation paddles.

6. The shutter mechanism of claim 4, wherein said first and second sets of actuation paddles are each provided respectively at opposite sides of said first and second clamshell shutters.

7. A shutter mechanism for a portable data storage cartridge, said portable data storage cartridge having an exterior housing and having an access opening in said exterior housing; said shutter mechanism comprising:

first and second clamshell shutters arranged to meet and form a common junction; each said clamshell shutter having a pivot axis substantially parallel to said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;

first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and springs arranged to urge said first and second clamshell shutters about said respective pivot axis toward said common junction;

wherein said first and second clamshell shutters each comprises a flat surface at said common junction extending longitudinally along said common junction, said flat surface facing outwardly at said access opening, whereby an opposed edge of each of said flat surfaces form said common junction; and wherein said first and second clamshell shutters each comprises a section of a peripheral surface of a right cylinder extending from said flat surface away from said common junction, and having end caps mounting said actuation paddles.

8. The shutter mechanism of claim 7, wherein said first and second clamshell shutters section of a peripheral surface comprises a section of a peripheral surface of a circular right cylinder.

9. A shutter mechanism for a portable data storage cartridge, said portable data storage cartridge having an exterior housing and having an access opening in said exterior housing; said shutter mechanism comprising:

first and second clamshell shutters arranged to meet and form a common junction; each said clamshell shutter having a pivot axis substantially parallel to said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;

first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and springs arranged to urge said first and second clamshell shutters about said respective pivot axis toward said common junction;

wherein said first and second clamshell shutters each comprises a flat surface at said common junction extending longitudinally along said common junction, said flat surface facing outwardly at said access opening, whereby an opposed edge of each of said flat surfaces form said common junction; and wherein said first and second clamshell shutters each comprises an angled flat surface extending from said flat surface away from said common junction and at an angle such that said angled flat surface is, at a line thereof, perpendicular to a plane intercepting said respective pivot axis.

10. A shutter mechanism for a portable data storage cartridge, said portable data storage cartridge having an exterior housing and having an access opening in said exterior housing; said shutter mechanism comprising:

first and second clamshell shutters arranged to meet and form a common junction; each said clamshell shutter having a pivot axis comprising a pivot at each of opposite ends thereof, said pivot axis substantially parallel to said common junction;

first and second sets of actuation paddles positioned respectively at said first and second clamshell shutters, and formed in common with said respective first and second clamshell shutters; said actuation paddles arranged to, when engaged by actuation pins, pivot said respective clamshell shutter in opposite directions away from said common junction;

first and second sets of trunion bearings mounted within said portable data storage cartridge, each said set of trunion bearings mounting said pivots of one of said clamshell shutters to form said pivot axis thereof such that said pivot axes are parallel to one another, such that said common junction is positioned at said access opening of said exterior housing, such that, when pivoted away from said common junction by said engaged actuation paddles to expose said access opening, each said clamshell shutter remains within said exterior housing, and such that said pivots of said first and second clamshell shutters are closely adjacent and separated; and springs arranged to urge said first and second clamshell shutters about said respective pivot axis toward said common junction.

11. The shutter mechanism of claim 10, wherein said first and second sets of actuation paddles are each provided respectively at opposite sides of said first and second clamshell shutters.

12. The shutter mechanism of claim 11, wherein said actuation paddles are of a length such that the end thereof opposite a respective pivot axis, when engaged by said actuation pins at a camming surface thereof to pivot said respective clamshell shutters in opposite directions away from said common junction to the extent that said respective clamshell shutters are pivoted to a fully open position exposing said access opening, said actuation pins move across said end thereof, thereby limiting said pivoting.

13. The shutter mechanism of claim 12, wherein said clamshell shutters and said commonly formed actuation paddles are formed from a Polytetrafluoroethylene filled plastic.

14. A shutter mechanism for a portable data storage cartridge, said portable data storage cartridge having an exterior housing and having an access opening in said exterior housing; said shutter mechanism comprising:

first and second clamshell shutters arranged to meet and form a common junction; each said clamshell shutter having a pivot axis substantially parallel to said common junction; said first and second clamshell shutters each comprising a section of a surface that is parallel to and radially spaced from said pivot axis, said section of said surface extending away from said common junction;

first and second sets of actuation paddles positioned respectively at said first and second clamshell shutters, each actuation paddle of a set positioned respectively at opposite sides of said first and second clamshell shutters; said actuation paddles arranged to, when engaged by actuation pins, pivot said respective clamshell shutter in opposite directions away from said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, such that, when pivoted away from said common junction by said engaged actuation paddles to expose said access opening, each said clamshell shutter remains within said exterior housing, and such that said pivots of said first and second clamshell shutters are closely adjacent and separated; and springs arranged to urge said first and second clamshell shutters about said respective pivot axis toward said common junction.

15. The shutter mechanism of claim 14, wherein said actuation paddles each comprises a straight said camming surface for engagement by said one of said actuation pins.

16. The shutter mechanism of claim 14, wherein said actuation paddles each comprises a concave said camming surface for engagement by said one of said actuation pins.

17. The shutter mechanism of claim 14, wherein said actuation paddles each comprises a convex said camming surface for engagement by said one of said actuation pins.

18. A shutter mechanism for a portable data storage cartridge, said portable data storage cartridge having an exterior housing and having an access opening in said exterior housing; said shutter mechanism comprising:

first and second clamshell shutters arranged to meet and form a common junction; each said clamshell shutter having a pivot axis substantially parallel to said common junction;

first and second sets of actuation paddles positioned respectively at said first and second clamshell shutters, each actuation paddle of a set positioned respectively at opposite sides of said first and second clamshell shutters; said actuation paddles arranged to, when engaged by actuation pins, pivot said respective clamshell shutter in opposite directions away from said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, such that, when pivoted away from said common junction by said engaged actuation paddles to expose said access opening, each said clamshell shutter remains within said exterior housing, and such that said pivots of said first and second clamshell shutters are closely adjacent and separated; and springs arranged to urge said first and second clamshell shutters about said respective pivot axis toward said common junction;

wherein said actuation paddles each comprises a camming surface for engagement by one of said actuation pins, and wherein said camming surfaces are of a length such that ends thereof opposite a respective pivot axis, when engaged by said actuation pins to pivot said respective clamshell shutters in opposite directions away from said common junction to the extent that said respective clamshell shutters are pivoted to a fully open position exposing said access opening, said actuation pins move across said end thereof, thereby limiting said pivoting.

19. The shutter mechanism of claim 18, wherein said actuation paddles each comprises a Polytetrafluoroethylene filled plastic at said camming surface thereof for engagement by one of said actuation pins.

20. A portable data storage cartridge, comprising:

at least a data storage medium for storing data;

an exterior housing;

an access opening in said exterior housing for external access to data of said data storage medium;

first and second clamshell shutters arranged to meet and form a common junction; each said clamshell shutter having a pivot axis substantially parallel to said common junction; said first and second clamshell shutters each comprising a section of a surface that is parallel to and radially spaced from said pivot axis, said section of said surface extending away from said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;

first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and springs arranged to urge said first and second clamshell shutters about said respective pivot axis toward said common junction.

21. The portable data storage cartridge of claim 20, wherein said first and second clamshell shutters each comprises a flat surface at said common junction extending longitudinally along said common junction, said flat surface facing outwardly at said access opening, whereby an opposed edge of each of said flat surfaces form said common junction.

22. The portable data storage cartridge of claim 21, wherein said opposed edges of each of said flat surfaces forming said common junction are straight and parallel to said respective pivot axis, such that said common junction comprises a straight line parallel to said pivot axes.

23. A portable data storage cartridge, comprising:

at least a data storage medium for storing data;

an exterior housing;

an access opening in said exterior housing for external access to data of said data storage medium;

first and second clamshell shutters arranged to meet and form a common junction; each said clamshell shutter having a pivot axis substantially parallel to said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;

first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and springs arranged to urge said first and second clamshell shutters about said respective pivot axis toward said common junction; and wherein said first and second clamshell shutters each comprises a pivot at each of opposite ends thereof to form said pivot axis, and wherein said first and second sets of pivot supports each comprises a set of trunion bearings arranged such that said pivots of said first and second clamshell shutters are closely adjacent and separated.

24. The portable data storage cartridge of claim 23, wherein said first and second clamshell shutters each comprises a section of a peripheral surface of a non-round right cylinder extending from said common junction, and having end caps mounting said actuation paddles.

25. The portable data storage cartridge of claim 23, wherein said first and second sets of actuation paddles are each provided respectively at opposite sides of said first and second clamshell shutters.

26. A portable data storage cartridge, comprising:
at least a data storage medium for storing data;
an exterior housing;
an access opening in said exterior housing for external access to data of said data storage medium;
first and second clamshell shutters arranged to meet and form a common junction; each said clamshell shutter having a pivot axis substantially parallel to said common junction;
first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;
first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and
springs arranged to urge said first and second clamshell shutters about said respective pivot axis toward said common junction;
wherein said first and second clamshell shutters each comprises a flat surface at said common junction extending longitudinally along said common junction, said flat surface facing outwardly at said access opening, whereby an opposed edge of each of said flat surfaces form said common junction; and
wherein said first and second clamshell shutters each comprises a section of a peripheral surface of a right cylinder extending from said flat surface away from said common junction, and having end caps mounting said actuation paddles.

27. The portable data storage cartridge of claim 26, wherein said first and second clamshell shutters section of a peripheral surface comprises a section of a peripheral surface of a circular right cylinder.

28. A portable data storage cartridge, comprising:
at least a data storage medium for storing data;
an exterior housing;
an access opening in said exterior housing for external access to data of said data storage medium;
first and second clamshell shutters arranged to meet and form a common junction; each said clamshell shutter having a pivot axis substantially parallel to said common junction;
first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, and such that, when pivoted away from said common junction, each said clamshell shutter remains within said exterior housing;
first and second sets of actuation paddles positioned respectively at said first and second clamshell shutters, said actuation paddles arranged to, when engaged by actuation pins, pivot said respective clamshell shutter in opposite directions about said pivot axis away from said common junction to expose said access opening; and
springs arranged to urge said first and second clamshell shutters about said respective pivot axis toward said common junction;
wherein said first and second clamshell shutters each comprises a flat surface at said common junction extending longitudinally along said common junction, said flat surface facing outwardly at said access opening, whereby an opposed edge of each of said flat surfaces form said common junction; and
wherein said first and second clamshell shutters each comprises an angled flat surface extending from said flat surface away from said common junction and at an angle such that said angled flat surface is, at a line thereof, perpendicular to a plane intercepting said respective pivot axis.

29. A portable data storage cartridge, comprising:
at least a data storage medium for storing data;
an exterior housing;
an access opening in said exterior housing for external access to data of said data storage medium;
first and second clamshell shutters arranged to meet and form a common junction; each said clamshell shutter having a pivot axis comprising a pivot at each of opposite ends thereof, said pivot axis substantially parallel to said common junction;
first and second sets of actuation paddles positioned respectively at said first and second clamshell shutters, and formed in common with said respective first and second clamshell shutters; said actuation paddles arranged to, when engaged by actuation pins, pivot said respective clamshell shutter in opposite directions away from said common junction;
first and second sets of trunion bearings mounted within said portable data storage cartridge, each said set of trunion bearings mounting said pivots of one of said clamshell shutters to form said pivot axis thereof such that said pivot axes are parallel to one another, such that said common junction is positioned at said access opening of said exterior housing, such that, when pivoted away from said common junction by said engaged actuation paddles to expose said access opening, each said clamshell shutter remains within said exterior housing, and such that said pivots of said first and second clamshell shutters are closely adjacent and separated; and
springs arranged to urge said first and second clamshell shutters about said respective pivot axis toward said common junction.

30. The portable data storage cartridge of claim 29, wherein said first and second sets of actuation paddles are each provided respectively at opposite sides of said first and second clamshell shutters.

31. The portable data storage cartridge of claim 30, wherein said actuation paddles are of a length such that the end thereof opposite a respective pivot axis, when engaged by said actuation pins at a camming surface thereof to pivot said respective clamshell shutters in opposite directions away from said common junction to the extent that said respective clamshell shutters are pivoted to a fully open position exposing said access opening, said actuation pins move across said end thereof, thereby limiting said pivoting.

32. The portable data storage cartridge of claim 31, wherein said clamshell shutters and said commonly formed actuation paddles are formed from a Polytetrafluoroethylene filled plastic.

33. A portable data storage cartridge, comprising:

at least a data storage medium for storing data;

an exterior housing;

an access opening in said exterior housing for external access to data of said data storage medium;

first and second clamshell shutters arranged to meet and form a common junction; each said clamshell shutter having a pivot axis substantially parallel to said common junction; said first and second clamshell shutters each comprising a section of a surface that is parallel to and radially spaced from said pivot axis, said section of said surface extending away from said common junction;

first and second sets of actuation paddles positioned respectively at said first and second clamshell shutters, each actuation paddle of a set positioned respectively at opposite sides of said first and second clamshell shutters; said actuation paddles arranged to, when engaged by actuation pins, pivot said respective clamshell shutter in opposite directions away from said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, such that, when pivoted away from said common junction by said engaged actuation paddles to expose said access opening, each said clamshell shutter remains within said exterior housing, and such that said pivots of said first and second clamshell shutters are closely adjacent and separated; and springs arranged to urge said first and second clamshell shutters about said respective pivot axis toward said common junction.

34. The portable data storage cartridge of claim 33, wherein said actuation paddles each comprises a straight said camming surface for engagement by said one of said actuation pins.

35. The portable data storage cartridge of claim 33, wherein said actuation paddles each comprises a concave said camming surface for engagement by said one of said actuation pins.

36. The portable data storage cartridge of claim 33, wherein said actuation paddles each comprises a convex said camming surface for engagement by said one of said actuation pins.

37. A portable data storage cartridge, comprising:

at least a data storage medium for storing data;

an exterior housing;

an access opening in said exterior housing for external access to data of said data storage medium;

first and second clamshell shutters arranged to meet and form a common junction; each said clamshell shutter having a pivot axis substantially parallel to said common junction;

first and second sets of actuation paddles positioned respectively at said first and second clamshell shutters, each actuation paddle of a set positioned respectively at opposite sides of said first and second clamshell shutters; said actuation paddles arranged to, when engaged by actuation pins, pivot said respective clamshell shutter in opposite directions away from said common junction;

first and second sets of pivot supports mounted within said portable data storage cartridge, each said set of pivot supports mounting said pivot axis of one of said clamshell shutters such that said pivot axes are parallel to one another, such that said common junction is positioned at said access opening of said exterior housing, such that, when pivoted away from said common junction by said engaged actuation paddles to expose said access opening, each said clamshell shutter remains within said exterior housing, and such that said pivots of said first and second clamshell shutters are closely adjacent and separated; and springs arranged to urge said first and second clamshell shutters about said respective pivot axis toward said common junction; and wherein said actuation paddles each comprises a camming surface for engagement by one of said actuation pins, and wherein said camming surfaces are of a length such that ends thereof opposite a respective pivot axis, when engaged by said actuation pins to pivot said respective clamshell shutters in opposite directions away from said common junction to the extent that said respective clamshell shutters are pivoted to a fully open position exposing said access opening, said actuation pins move across said end thereof, thereby limiting said pivoting.

38. The portable data storage cartridge of claim 37, wherein said actuation paddles each comprises a Polytetrafluoroethylene filled plastic at said camming surface for engagement by one of said actuation pins.

* * * * *